United States Patent [19]
Ogihara et al.

[11] Patent Number: 4,697,908
[45] Date of Patent: Oct. 6, 1987

[54] PROGRAM SHUTTER

[75] Inventors: Masuo Ogihara; Hajime Oda; Yoichi Seki; Hiroshi Yamazaki, all of Yotsukaido, Japan

[73] Assignee: Seikosha Co., Ltd., Tokyo, Japan

[21] Appl. No.: 706,505

[22] Filed: Feb. 28, 1985

[30] Foreign Application Priority Data

Mar. 1, 1984 [JP] Japan .................................. 59-39083

[51] Int. Cl.$^4$ .............................................. G03B 7/08
[52] U.S. Cl. .................................... 354/439; 354/437; 354/452
[58] Field of Search ................. 354/437, 439, 451, 452

[56] References Cited

U.S. PATENT DOCUMENTS

4,306,786 12/1981 Carcia et al. ......................... 354/437
4,325,614 4/1982 Grimes ................................ 354/437
4,362,372 12/1982 Kiesel .................................. 354/437

Primary Examiner—Russell E. Adams
Attorney, Agent, or Firm—Bruce L. Adams; Van C. Wilks

[57] ABSTRACT

A program shutter has a shutter mechanism comprised of at least one sector movable in opening and closing directions in response to forward and reverse rotation of a step motor to form a lens aperture. A control unit automatically controls the shutter operation and comprises an exposure quantity storage circuit for storing exposure quantity data corresponding to the brightness of a subject being photographed, a motor control data storage circuit for storing step drive number data proportional to the exposure quantity data and interpolation quantity data corresponding to the exposure quantity data, a pulse generator circuit for generating step drive pulses and clock pulses, a first presettable counter preset with the step drive number data before opening of the sector and downcounted to zero by the drive pulses, a second presettable counter preset with the interpolation quantity data and downcounted to zero by the clock pulses beginning at a time after the first counter has downcounted to zero, a reverse drive circuit for detecting when the second counter has counted down to zero and thereafter effecting rotation of the step motor in the reverse direction, and a motor drive circuit for rotationally driving the step motor according to the drive pulses generated by the pulse generator circuit means.

17 Claims, 12 Drawing Figures

| | | | | |
|---|---|---|---|---|
| I | $E_{x1}$ | $P_1$ | $N_{s1}$ | $T_{d1}$ |
| | $E_{x2}$ | $P_2$ | $N_{s2}$ | $T_{d2}$ |
| | ⋮ | ⋮ | ⋮ | ⋮ |
| | $E_{xn}$ | $P_n$ | $N_{sn}$ | $T_{dn}$ |
| II | $Afm_1 + C_0$ | $T_{f1}$ | | $E_{o1}$ |
| | $Afm_2 + C_0$ | $T_{f2}$ | | $E_{o2}$ |
| | ⋮ | ⋮ | | ⋮ |
| | $Afm_n + C_0$ | $T_{fn}$ | | $E_{on}$ |
| III | $E_{x1} + C_1$ | $T_{e1}$ | | |
| | $E_{x2} + C_1$ | $T_{e2}$ | | |
| | ⋮ | ⋮ | | |
| | $E_{xn} + C_1$ | $T_{en}$ | | |
| IV | $Daf_1 + C_2$ | $D_1$ | | |
| | $Daf_2 + C_2$ | $D_2$ | | |
| | ⋮ | ⋮ | | |
| | $Daf_n + C_2$ | $D_n$ | | |

PROGRAM SHUTTER

BACKGROUND OF THE INVENTION

1. Technical Field

The present invention relates to a program shutter to perform an opening and closing operation of a shutter blade using a step motor.

2. Prior Art

A program shutter to open and close a shutter blade using a step motor is so constituted that drive pulses having a definite period are applied to a step motor during a release operation so that the motor is rotated in the forward direction and a shutter sector is opened gradually, and when the step rotation corresponding to the desired exposure quantity has been performed, the phase of the drive pulses is changed so that the step motor is rotated in the reverse direction and the shutter sector is closed so as to obtain prescribed exposure.

Since the maximum rotation speed of the step motor used for the shutter is as low as about 500–1000 pulses/sec, the minimum time required for the rotation of one step is restricted, and particularly when exposing for a short time, a large error may be produced and the most favorable exposure step cannot be obtained. This has become a serious problem in view of the recent development of high sensitivity films.

In order to solve such as problem, the applicant of the present invention has already proposed a program shutter where the rotation step number of a step motor and an interpolation quantity are determined corresponding to a certain exposure quantity so that when the shutter is opened, a sector is driven in step according to step drive pulses corresponding to the rotation step number, and when the last step drive pulse is outputted and thereafter a period of time corresponding to the interpolation quantity elapses, the step motor is rotated in the reverse direction and the interval between steps is subdivided so as to obtain the suitable exposure quantity. In such a program shutter, however, since considerable data processing is required for the timing control, in random logic circuitry comprised of combinations of logical elements such as gates, flipflops and counters, regularity between element arrangement and connection is obstructed and, therefore, not only is the circuit complicated but also the system is fixed so that apparatus difference accompanied with such an electric shutter cannot be corrected by circuit means.

SUMMARY OF THE INVENTION

In view of above-mentioned problems, an object of the present invention is to provide a program shutter which can process signals sequentially and which is simple and versatile.

DETAILED DESCRIPTION OF THE INVENTION

Figure 1:
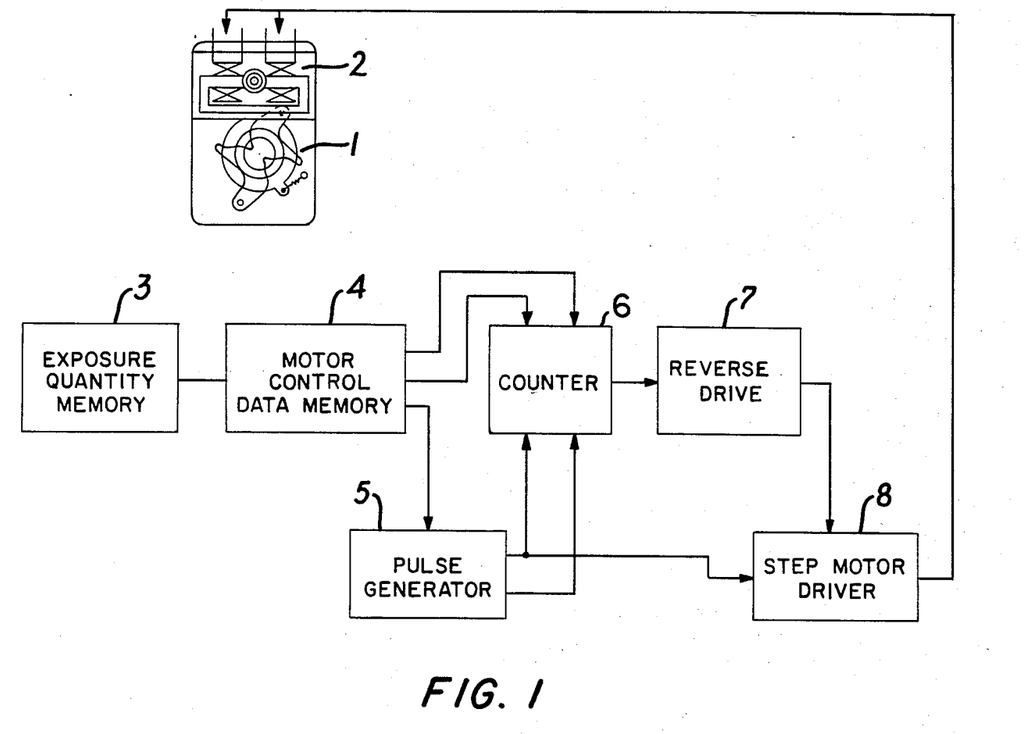
FIG. 1 shows a schematic diagram of a program shutter according to the present invention.

As shown in FIG. 1, a program shutter comprises a shutter mechanism having a shutter sector 1 to form a lens aperture and which is opened or closed by a step motor 2 rotatable in forward or reverse directions, and a control unit including an exposure quantity memory circuit means 3 to store exposure quantity data corresponding to subject brightness, a motor control data memory circuit means 4 to store step drive number data corresponding to the exposure quantity and interpolation quantity as data and the exposure quantity as address and to enable access according to the exposure quantity measured during the photographing, a pulse generator circuit means 5 to generate step drive pulses and clock pulses, a counter means 6 in which the step number is preset before the sector is opened, the interpolation quantity data is preset when downcount to zero is effected according to the step drive pulses from the pulse generator circuit means 5, and the step number is preset again when downcount to zero is effected according to the clock pulse, a reverse drive circuit means 7 to detect the time when the interpolation quantity of the counter means 6 becomes zero and to effect reverse rotation of the pulse motor, and a step motor drive circuit means 8 to drive the step motor according to pulses from the pulse generator circuit means 5.

Figure 2A:
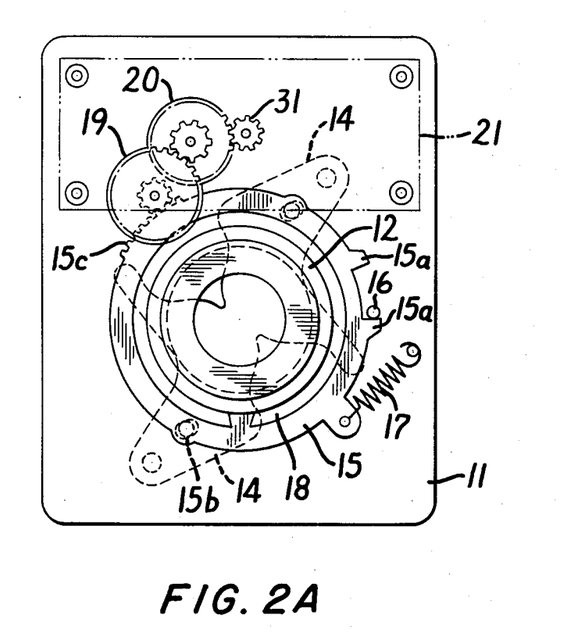
FIG. 2A shows a plan view of a shutter driving mechanism.
Figure 2B:
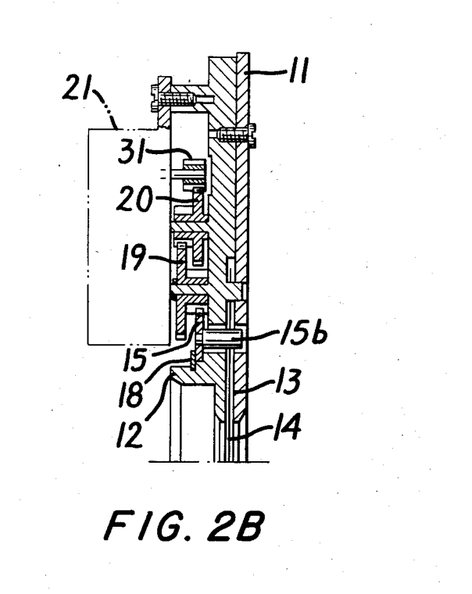
FIG. 2B shows a sectional view of the shutter driving mechanism shown in FIG. 2A.

FIG. 2 shows in more detail one embodiment of a program shutter mechanism of the invention. In FIG. 2, reference numeral 11 designates a bed plate on which a front plate 12 to position a lens at an aperture is mounted. A sector chamber 13 is formed between the bed plate 11 and the front plate 12 and encloses sectors 14, 14. A sector ring 15 drives the sectors 14, 14 in opening and closing directions and the rotation range of the sector ring 15 is restricted by step members 15a, 15a formed on outer circumference thereof and a pin 16 planted on the base plate 11. The sector ring 15 is biased in the counterclockwise direction in FIG. 2 by a spring 17 hooked between the sector ring 15 and the base plate 11, and the sector ring 15 is rotatably mounted at the outer circumference of the front plate 12 by a retaining ring 18. Two sector pins 15b, 15b are planted on the surface of the sector ring 15 at the base plate side in symmetry with respect to the optical axis and slidably engaged in slots formed in the sectors 14, 14 respectively. A series of teeth 15c is formed on the outer circumference of the sector ring 15 and engaged through train of toothed rings 19, 20 to a pinion 31 of a step motor 21 (as hereinafter described) so as to perform opening and closing of the sectors 14,14 according to drive pulses.

Figure 3A:
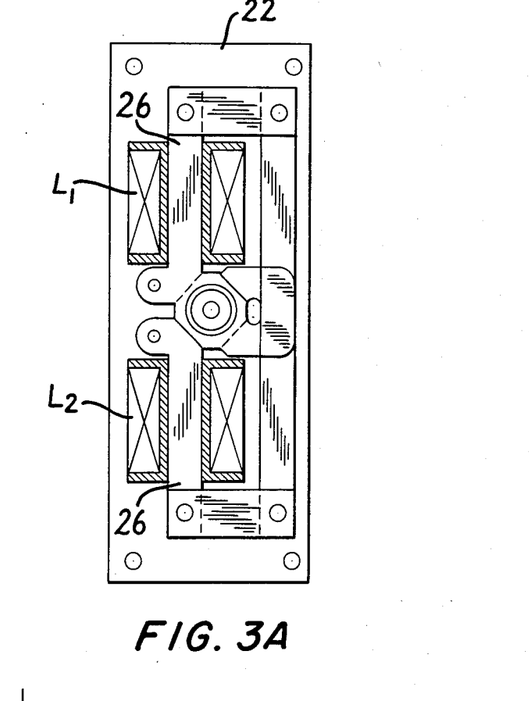
FIG. 3A shows a plan view of a bidirectional stepping motor.
Figure 3B:
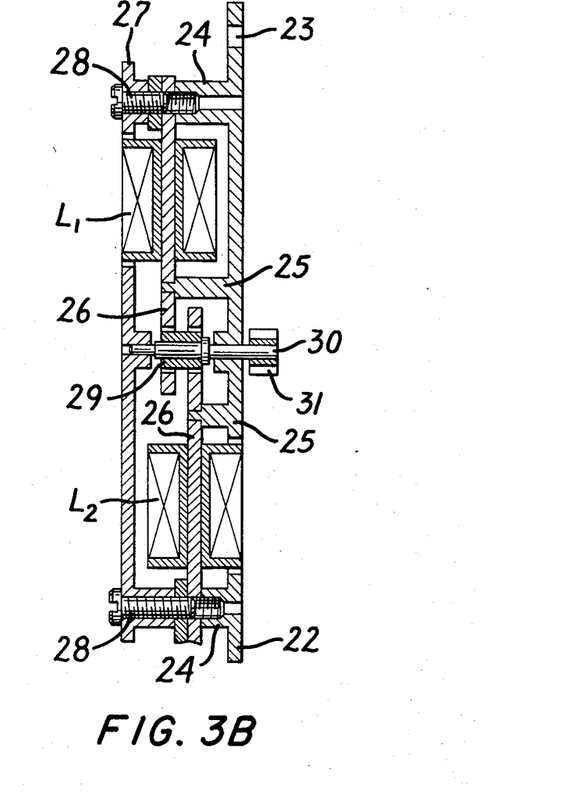
FIG. 3B shows a sectional view of the bidirectional stepping motor shown in FIG. 3A.

FIG. 3 shows an embodiment of the step motor 21 which is rotatable in forward and reverse directions. In FIG. 3, a motor bottom plate 22 has a mounting hole 23 bored therein for engagement with the base plate 11 of the shutter body by means of a screw, and two stators 26, 26 are opposed to each other in the vertical direction by means of columns 24, 24 and guide pins 25, 25 all planted on the surface of the motor bottom plate 22. A motor top plate 27 is fixed to the columns 24, 24 using screws 28, 28, and a rotor 29 comprised of a permanent magnet is rotatably supported by the motor bottom plate 22 and the top plate 27. A motor shaft 30 projects from one side of the rotor 29 and a pinion 31 is attached thereto so as to effect the rotation in the forward or reverse direction according to step drive pulses supplied from a motor drive circuit (as hereinafter described) or quantity pulses. Symbols $L_1$, $L_2$ in FIG. 3 designate first and second drive coils wound on the stators 26, 26, respectively.

Figure 4:
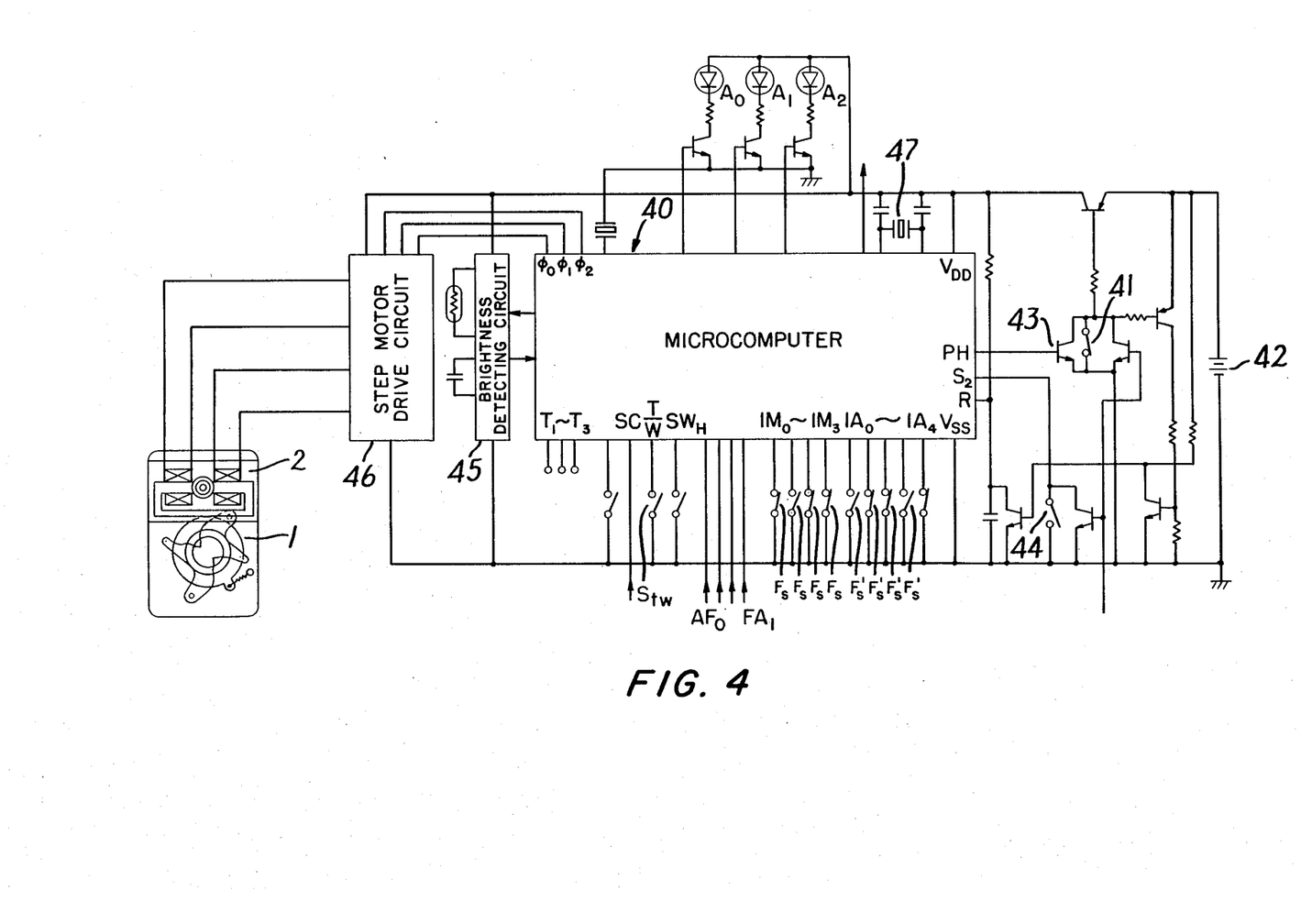
FIG. 4 shows a microcomputer circuitry for controlling a programmable shutter.

FIG. 4 shows an embodiment of a signal processor which comprises an essential part of the invention. In FIG. 4, numeral 40 designates a micro computer constituting the central portion of the signal processor, and the micro computer 40 is supplied with working voltage $V_{DD}$ from a power source 42 by a power source switch 41 interlocking with a release button (not shown) and its power is held by a transistor 43. When the power source switch 41 is turned ON, the micro computer 40 starts a series of operations based on its program, and when a release switch 44 is turned ON and subsequently a prescribed time elapses, the operations are stopped since the supply of the working voltage is interrupted. A brightness detecting circuit 45 to generate a signal suitable for apex operation with width of N times at the subject brightness of $\sqrt{2}$ times is connected to an input port of the micro computer 40, and the step motor 2 to drive the sector 1 is connected through a step motor drive circuit 46 to output ports $\phi_o$–$\phi_2$. Symbols $F_s$, $F_s'$ in FIG. 4 designate a film sensitivity automatic setting switch group and a film sensitivity manual setting group, symbol $S_{tw}$ a telephoto/wide angle detecting switch, symbols $A_o$–$A_2$ indicator lamps to effect various alarms, and numeral 47 a crystal vibrator, respectively.

Figure 5:
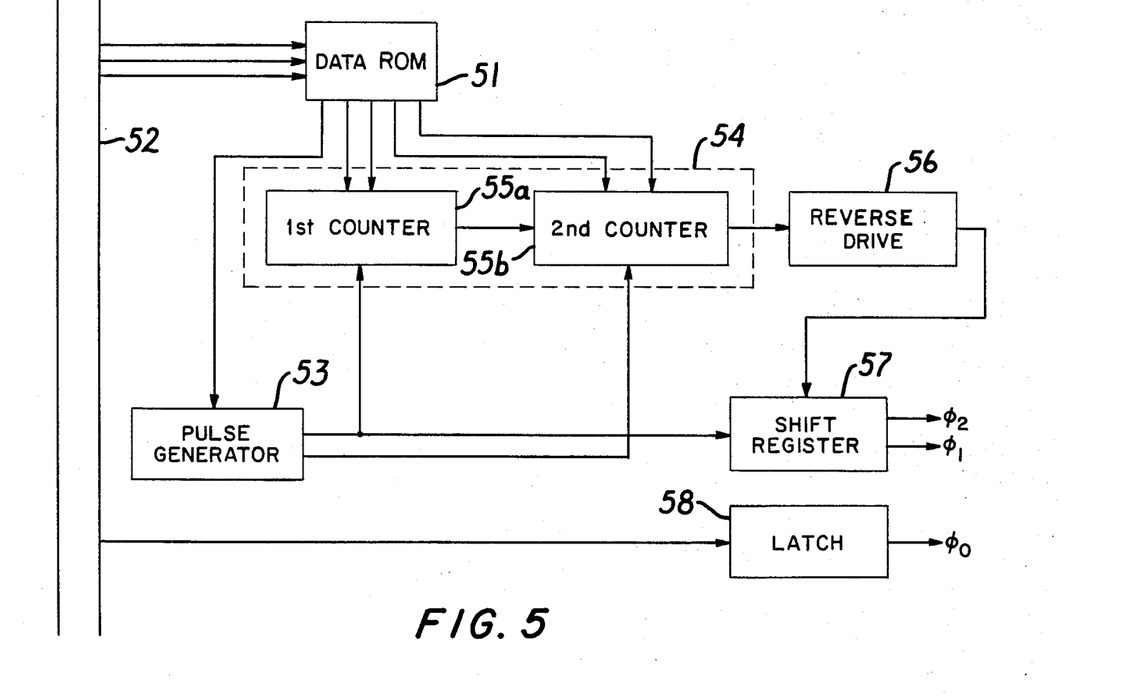
FIG. 5 shows a block diagram of a stepping motor driving circuit.
Figure 6:
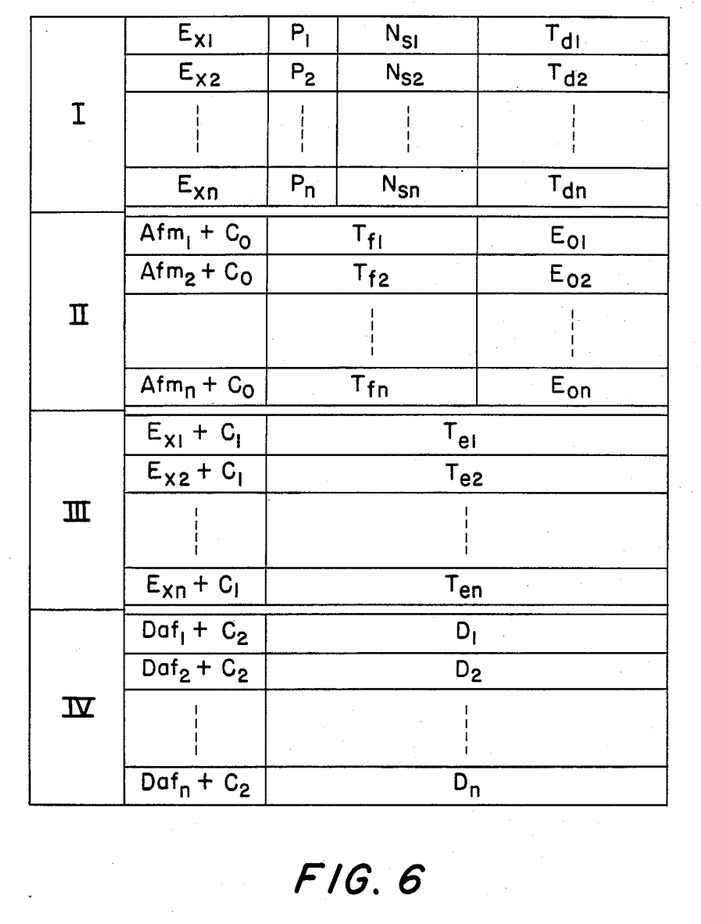
FIG. 6 shows a block diagram of a memory device storing controlling data.

FIG. 5 shows a block diagram of an embodiment of a motor drive signal generating circuit or stepping motor driving means. In FIG. 5, numeral 51 designates a data ROM to receive access according to exposure data inputted through a data bus 52. As shown in FIG. 6, the data ROM 51 is divided into four blocks I–IV to store motor control data or exposure data (blocks II and III), strobe photographing data and distance apex code data respectively.

More specifically, the block I stores data relating to the amount or extent of step motor rotation corresponding to the exposure time in consideration of the time shift with drive shaft caused by response delay of the mechanical system. Repetition frequency or pulse frequency data P proportional to the exposure quantity, that is, data P to select pulses of long period at large exposing times and pulses of short period at small exposing times, step number or pulse number data $N_s$ to effect step rotation according to the selected pulse number, and interpolation quantity or transition interval data $T_d$ representing the width of the transition pulses at the directon changing are combined in a set, and the exposure quantity E is stored as an address and accessed with the exposure quantity data $E_x$ determined by EE operation, thereby the rotation amount of the step motor corresponding to the exposure quantity is obtained.

The block II stores the time information to trigger the strobe when a sector is opened to a prescribed F value obtained by the operation and to effect the node flashing if there is no mechanism to stop the sector at the F value obtained by the EE operation as in the case of such an electric shutter. Timing $T_f$ becoming a prescribed aperture value F during the sector opening process is made data, and a constant value $C_o$ in consideration of the time shift caused by response delay of the mechanical system is added to the operation value Afm and thus the value (Afm + $C_o$) is stored as an address. Timing for the aperture to become a prescribed aperture value F by access according to the operation value Afm is outputted. Information to perform strobe photographing at the rear light photographing, that is, in order to compare the maximum aperture diameter obtained by EE photographing with the aperture diameter required for the strobe photographing, value $E_o$ corresponding to operation value $E_x$ of the EE operation becoming equal to the aperture diameter required for the strobe photographing is also written. If $E_x \leq E_o$, the aperture diameter required for the strobe is larger and a signal to select the crest flashing is outputted; if $E_x > E_0$, a signal to select the node flashing is outputted.

In the block III, the time of generating a signal to reverse the rotational direction of the step motor is taken as a reference point, and, in consideration of time shaft between the generation of the reversing signal and the actual reverse rotation of the sector, a constant value $C_1$ corresponding to the time shift is added to the value $E_o$ and thus the sum value $E_1$ is taken as an address and the timing $T_f$ of the node flashing is stored as data so that time information to flash the strobe at the maximum aperture, i.e. to effect so-called crest flashing is outputted.

In the block IV, a constant value $C_2$ is added to sequence code data Daf and thus the sum value is taken as an address and the apex value of the distance is stored as data, and the sequence code of the distance obtained from the autofocus circuit is converted into apex code data and outputted.

Referring to FIG. 5 again, numeral 53 designates a pulse generator circuit to generate drive pulses corresponding to the repetition or pulse frequency data P read from the block I of the data ROM 51. Numeral 54 designates a counter in which the data read from the data ROM 51 is preset. The counter 54 is composed of first and second counters 55a, 55b. The first counter 55a is preset with the step drive or pulse number $N_s$ before the sector opening and before the reverse rotation of the step motor and then downcounted according to pulses from the pulse generator circuit 53. The second counter 55b is preset with the interpolation quantity or transition interval data $T_d$ and operates a reversing drive circuit 56 (as hereinafter described) when it is downcounted to zero according to the reference clock pulses. The reversing drive circuit 56 detects the time for the interpolation quantity of the second counter 55b to become zero and then generates a signal. A shift register 57 transforms the drive pulse from the pulse generator circuit 43 into forward and reverse driving pulses which are composed of two-phase pulses $\phi_1$, $\phi_2$ with a phase difference of 180 degrees and inverts the phase of the output pulses according to a signal from the reversing drive circuit 56. A latch circuit 58 outputs a $\phi_o$ phase signal according to a signal from the data bus 52.

Figure 7:
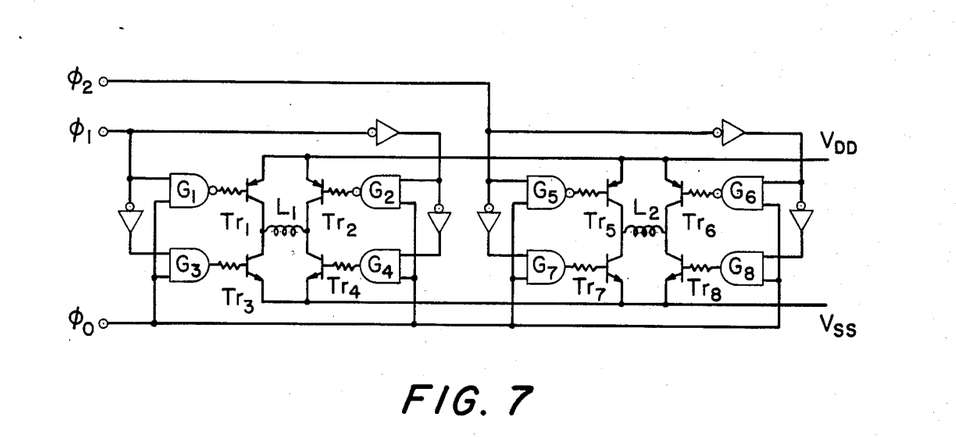
FIG. 7 shows a detailed structure of the stepping motor driving circuit.

FIG. 7 shows an embodiment of a step motor drive circuit. Drive coils $L_1$, $L_2$ of the step motor are connected through alternate changing circuits composed of gates $G_1$–$G_4$ and $G_5$–$G_8$ to transistors $Tr_1$–$Tr_4$ and TR$_5$–Tr$_8$, respectively. The step motor is driven in forward or reverse directions in response to signals $\phi_1$, $\phi_2$ and $\phi_o$ from the shift register 57 and the latch circuit 58.

Figure 8:
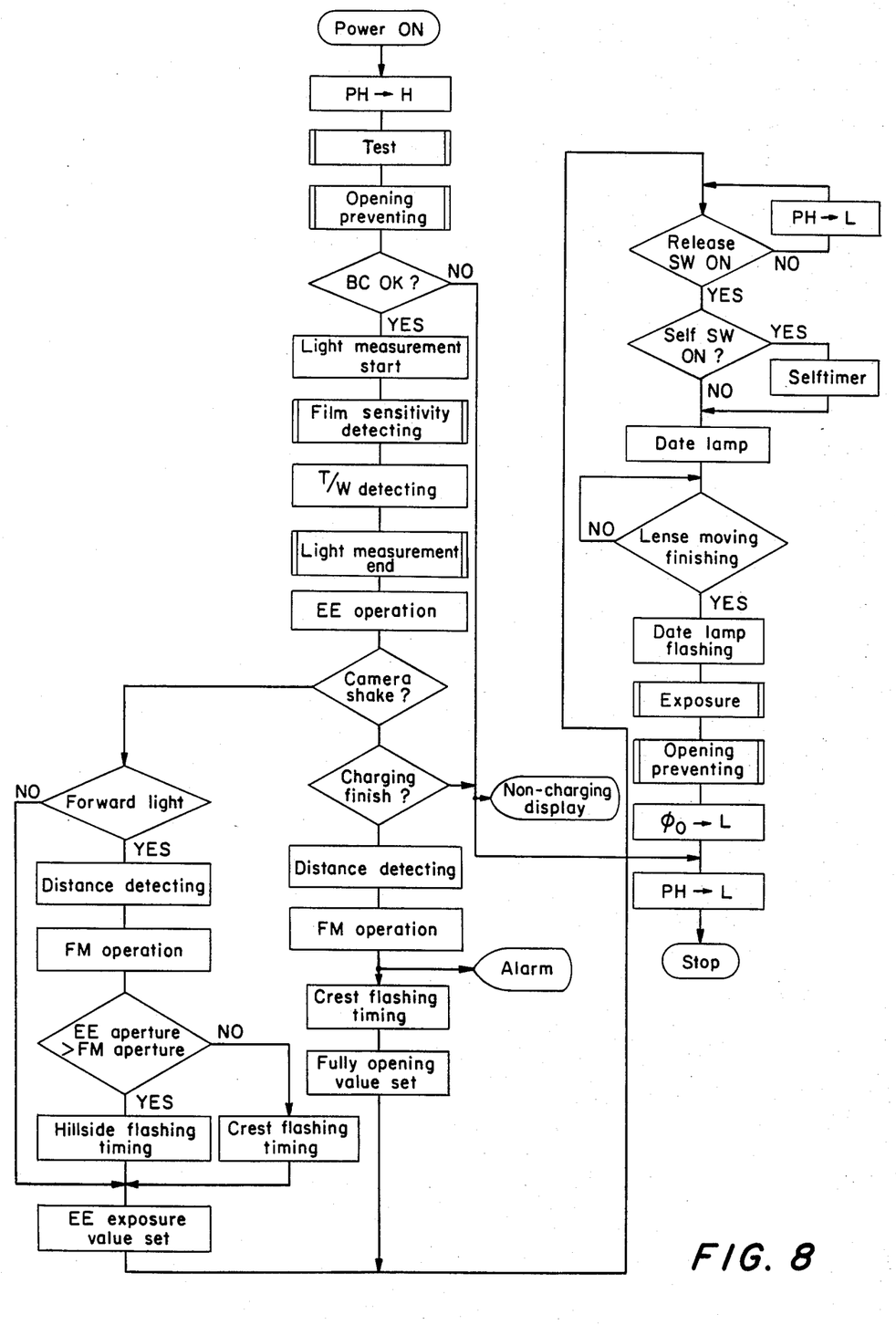
FIGS. 8 and 9 are a flow draft showing the operation steps of the programmable shutter.

Operation of the apparatus will now be described with reference to a flow chart shown in FIG. 8.

If a release button (not shown) is pushed to a first position, the power source switch 41 which is interlocked with the release button is turned ON and working voltage V$_{DD}$ is supplied from the power source 42 to the signal processor or micro computer 40. After the lapse of a definite time, a signal is applied to a reset terminal R and reset of the apparatus is released so that the working voltage V$_{DD}$ is supplied to the apparatus irrespective of the ON/OFF state of the power source switch 41 so that testing is performed regarding whether the source voltage and the sector are normal.

If all checkings are passed in such manner, a timer (not shown) preset to a definite value, e.g. 100, acts and at the same time a light-measurement starting signal is outputted to the subject brightness detecting circuit 45. This loop is repeated until a decision is established regarding whether the light measuring value overflows or the light measurement ends. If the light measuring value becomes beyond the maximum value, and since error may be contained in the exposing or a camera shake may occur, the light measurement is stopped and the preset maximum value is set as the light measuring value.

Since this light measuring process requires a long waiting time in view of the principle of light measurement, the film sensitivity is detected in concurrence with the light measurement and transformed into apex operation code data and stored, and whether the lens is at front side of the photographing optical path or at rear side thereof is determined by the T/W switch S$_{td}$ and the aperture F value is detected.

If detection of the film sensitivity and the lens aperture F value is finished, the end of the light measurement is awaited. If the light measuring process is finished, operation of $E_x = L + S + A$ (wherein L: code of light measuring value, S: code of film sensitivity, A: code of difference of aperture F value) is executed and the exposure quantity is estimated. Since the exposure data $E_x$ represents the exposure quantity in the program shutter, this quantity is stored once.

When the EE operation is finished, the exposure quantity $E_x$ estimated in the previous step is compared with the reference value. If the exposure quantity is discriminated to be larger than the camera shake limit value, the strobe is to be used. So the SC terminal is checked for whether charging of the strobe is completed or not. If the charging is not completed, alarm is generated by lighting the alarm light and the subsequent steps are jumped and stopped. On the contrary, if the charging of the strobe is completed, distance information required for the strobe photographing is obtained through input terminals AF$_o$–AF$_3$ from an autofocus circuit (not shown) and transformed into apex code data.

When the distance information is determined, the shutter F value required during the strobe photographing is estimated from the film sensitivity, the distance D to the subject, and the strobe guide number G$_{no}$ by FM operation, that is, by G$_{no}$/D. If the Amf value has the aperture larger than the aperture F value of the lens, the aperture F value is taken. However, even if the aperture if fully opened, the light quantity is insufficient to take interlocking and therefore the alarm without interlocking is generated by lighting the alarm light (light emitting element).

In the case of rear light, the photographer operates the switch S$_w$ and information is inputted. The information is detected and the exposing time is determined by the operation value similarly to the usual case of strobe use and the strobe as auxiliary light is controlled depending on the distance to the subject. If the maximum aperture diameter obtained by the EE operation is smaller than that required for the strobe, a constant value is set according to data from the block II of the data ROM.

The operation described up to this point is performed automatically and continuously after the power source switch is turned ON.

When the release button (not shown) is pushed to a second position, whether the release switch 44 is turned ON is determined. If the switch is ON, the photographing mode begins. If the release switch 44 is not yet turned ON at this time, the light measurement only can be performed by turning the power source switch S$_1$ OFF. If the release switch 44 is again turned ON in this state, a power hold signal is outputted and the series of operations is executed until the end of the prescribed operation.

If the selftimer switch is ON after outputting the power hold signal, a time of about 10 seconds is measured and a display representing the selftimer state is effected.

After the lapse of a prescribed time in such a process, a magnet (not shown) is turned ON and the locking of a photographing lens is released and the lens is moved. When the lens is moved to a prescribed focal position, it is locked according to signal from the autofocus circuit and the lighting time of a date taking lamp is set corresponding to the film sensitivity at the timing of the signal from the autofocus circuit.

Figure 9:
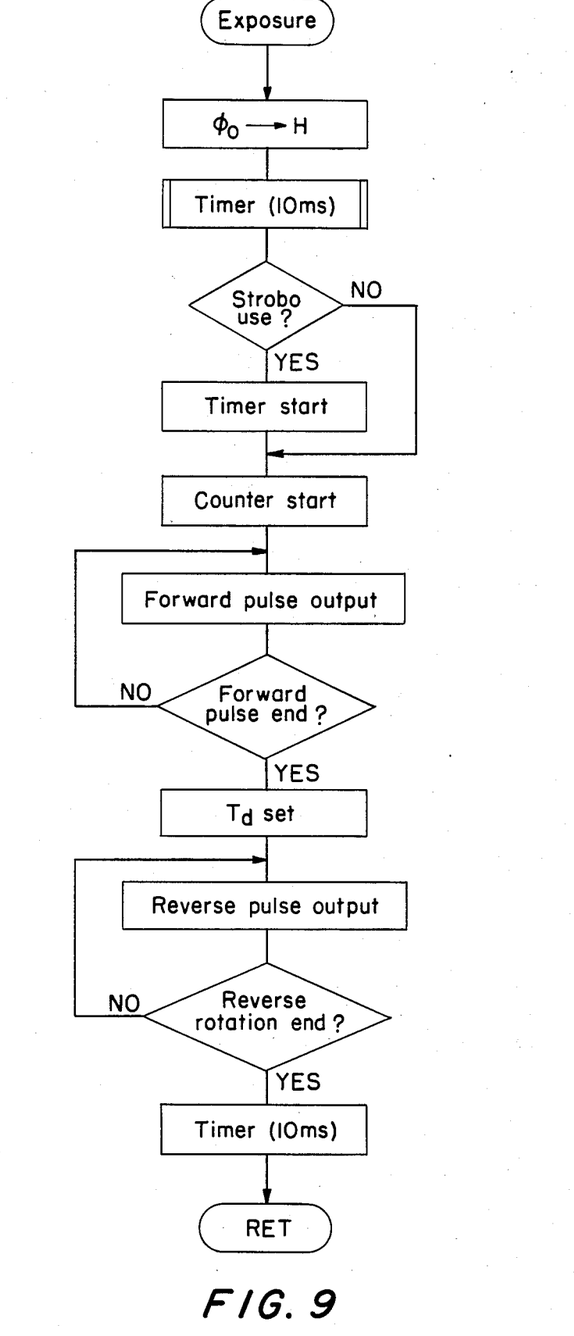

When all preparation is finished in such manner, the exposure process begins (FIG. 9).

Figure 10:
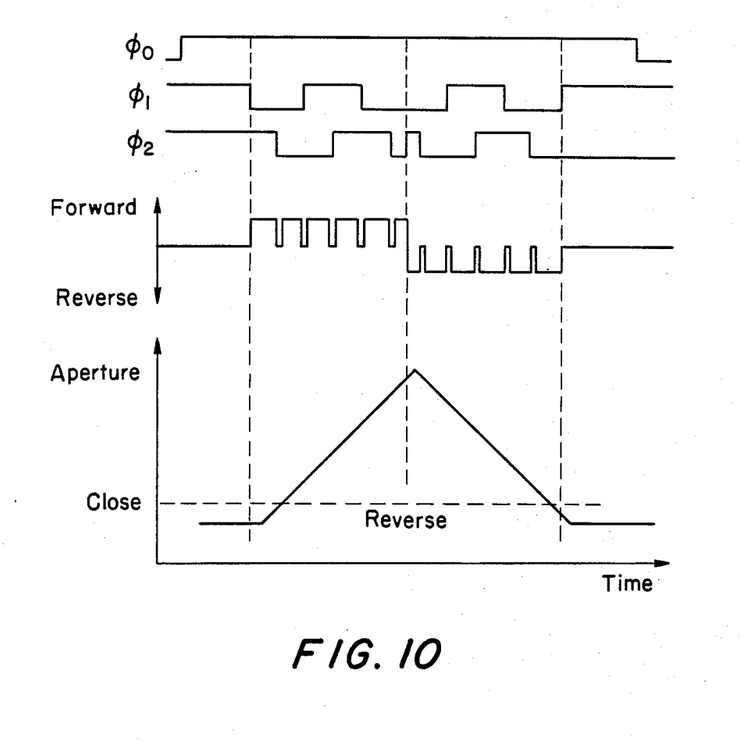
FIG. 10 shows waveforms of signals applied to the bidirectional stepping motor.

First, access is effected to address E of the block I of the ROM 51 according to the exposure data Ex calculated in the above-mentioned process, and a pulse of a prescribed repetition period corresponding to the exposure time is selected. Then the step drive or pulse number data N$_s$ corresponding to the exposure quantity is preset to the first counter 55a, and the interpolation quantity data is preset to the second counter 55b, and the signal or control pulse $\phi_o$ of the step motor is made high level and the step motor is excited (FIG. 10). This state is held for 10 ms and treatment is performed so that the step motor assumes a stable state for the subsequent process.

In other words, since the stationary position of the rotor immediately before the excitation is determined by the static pulling torque between the rotor magnet and the stator, the rotor is affected by friction or load and does not always stop at a definite position. Consequently, operation to return the rotor forcedly to a definite reference position is performed by means of excitation, and when the vibration of the rotor according to inertia is stopped just after the movement the correct exposure can be effected.

When the rotor is stationary, drive pulses having a selected pulse width P are inputted to the first counter 55a and the shift register 57, and forward drive pulses are applied through the motor drive circuit 46 to the step motor, so that the motor is rotated in the forward direction one step at a time and the sectors 14, 14 begin opening from the reference position and the counter downcounts one step at a time. When the step drive pulses corresponding to the number preset to the counter 55a have been outputted and countup is effected, clock pulses are outputted to the second counter 55b during the rotating state of the step motor to the final step and downcount of the second counter 55b is started. When the downcount of the second counter 55b progresses and attains the count end, the count finishing signal is generated. According to this signal, the step number $N_s$ is again preset from the block I of the data ROM 51 to the first counter 55a, and the shift register 57 is changed in its shift direction and the content is shifted by one bit, thereby pulses having the same pulse width P as that of the interpolation pulse immediately before the reverse rotation are outputted and the motor is forcedly rotated in the reverse direction. According to the reverse rotation of the step motor, the sectors 14, 14 gradually begin to close and every time one drive pulse is inputted, one incremental step rotation is effected. When the first counter 55a becomes zero, the step drive pulses are stopped. Thereby the sectors 14, 14 are returned to the original position and the light path is closed, and the signal $\phi_o$ of the step motor is outputted for a definite time, e.g. 10 ms, and the motor and the sectors are forcedly made stationary so as to prevent the re-exposure, and the counter 55a becomes zero and the latch circuit 58 is reset.

According to the invention as above described, a pulse width proportional to exposure quantity corresponding to subject brightness and step drive number and interpolation quantity as data and the exposure quantity as address are stored, and access is effected according to the exposure quantity. The step drive number is preset before the sector opening and downcount is effected according to the step drive pulses and the pulse motor is rotated in the forward direction. When the counter content becomes zero, the interpolation quantity data is preset, and when downcount to zero is effected according to the clock pulses the step drive number is preset again and the motor is rotated in the reverse direction. Therefore data required for driving the step motor can be stored in random access memory and controlled by a micro processor. Not only can data be processed sequentially and the circuit means constituted simply and at low cost, but also, by simple electric processing to store data in consideration of shift produced between a mechanism part and electric signal and non-linearity in sector opening curve, apparatus differences can be eliminated and uniformity of products and exposure accuracy can be significantly improved.

What is claimed is:

1. A program shutter comprising: a shutter mechanism including at least one sector movable in opening and closing directions to form a lens aperture, and a step motor rotatable in forward and reverse directions for opening and closing the sector; and a control unit comprising exposure quantity storage circuit means for storing exposure quantity data corresponding to the brightness of a subject being photographed, motor control data storage circuit means for storing step drive number data proportional to the exposure quantity data and interpolation quantity data corresponding to the exposure quantity data, pulse generator circuit means for generating step drive pulses, first presettable counter means presettable with the step drive number data before opening of the sector and downcounted to zero by the drive pulses, second presettable counter means presettable with the interpolation quantity data and downcounted to zero by the clock pulses commencing after the first counter means has downcounted to zero, reverse drive circuit means for detecting when the second counter means counts down to zero and thereafter effecting rotation of the step motor in the reverse direction, and motor drive circuit means for rotationally driving the step motor according to the drive pulses generated by the pulse generator circuit means.

2. A program shutter according to claim 1; wherein the motor control data storage circuit means comprises a read only memory.

3. A program shutter according to claim 2; wherein the read only memory has means for storing data corresponding to different step drive numbers and different interpolation quantities.

4. A programmable shutter for a camera comprising: shutter sector means means mounted to undergo displacement in opening and closing directions to form a variable lens aperture; sector drive means including a bidirectional stepping motor rotationally driveable in forward and reverse directions in response to forward and reverse driving pulses for effecting displacement of the shutter sector means in the opening and closing directions; brightness detecting means for detecting the brightness of an object to the photographed prior to the displacement of the shutter sector means and producing exposure data corresponding to the detected object brightness; control means receptive of the exposure data for producing a set of pulse number data, pulse frequency data and transition interval data which are related to one another so as to control the formation of the variable lens aperture according to the exposure data; and stepping motor driving means responsive to the set of data for sequentially producing the forward and reverse driving pulses based on the pulse number data and the pulse frequency data, and for producing a transition pulse interposed between the forward and reverse driving pulses and having a pulse width determined by the transition interval data, the pulse width being sufficient to adjust for a response delay of the shutter sector means and the sector drive means in the course of reversing the direction of movement thereof.

5. A programmable shutter according to claim 4; wherein the brightness detecting means includes a brightness detecting circuit for detecting the object brightness, and calculating means for calculating the exposure data based on the detected brightness.

6. A programmable shutter according to claim 5; wherein the calculating means includes means for performing the calculation of the exposure data $E_x$ according to the relation $$E_x = L + S + A$$

where L is a code of the detected brightness, S is a code of film sensitivity, and A is a code of difference of aperture F value.

7. A programmable shutter according to claim 4; wherein the control means includes memory means for storing different sets of data accessible according to the exposure data.

8. A programmable shutter according to claim 7; wherein the memory means comprises a read only memory device.

9. A programmable shutter according to claim 4; wherein the brightness detecting means includes means for producing exposure data comprised of exposure time data and exposure quantity data.

10. A programmable shutter according to claim 9; wherein the control means includes means for producing the pulse frequency data based on the exposure time data.

11. A programmable shutter according to claim 9; wherein the control means includes means for producing the pulse number data proportional to the exposure quantity data.

12. A programmable shutter according to claim 4; wherein the stepping motor driving means includes a pulse generator for producing drive pulses having a frequency determined by the pulse frequency data and reference clock pulses having a predetermined frequency.

13. A programmable shutter according to claim 12; wherein the stepping motor driving means includes a first counter for counting a certain number of the drive pulses fed from the pulse generator according to the pulse number data to thereby produce the forward driving pulses.

14. A programmable shutter according to claim 13; wherein the stepping motor driving means includes a second counter initiated by the last pulse of the forward driving pulses for counting a certain number of the clock pulses fed from the pulse generator according to the transition interval data to thereby determine the pulse width of the transition pulse.

15. A programmable shutter according to claim 14; wherein the stepping motor driving means includes means for producing a transition pulse composed of a pair of opposite polarity pulse components.

16. A programmable shutter according to claim 14; wherein the stepping motor driving means includes means for resetting the first counter in response to the output signal from the second counter to thereby enable the first counter to count a certain number of the drive pulses fed from the pulse generator according to the pulse number data to thereby produce the reverse driving pulses.

17. A programmable shutter according to claim 4; wherein the stepping motor driving means includes a latch circuit for applying control pulses to the stepping motor before the application of the forward driving pulses and after the application of the reverse driving pulses so as to stabilize the rotational movement of the stepping motor.

* * * * *